US011161386B2

(12) United States Patent
Dhanraj et al.

(10) Patent No.: US 11,161,386 B2
(45) Date of Patent: Nov. 2, 2021

(54) SWITCHABLE STABILIZER ASSEMBLY OF A VEHICLE (71) Applicant: Bayerische Motoren Werke Aktiengesellschaft, Munich (DE)

(72) Inventors: Prashant Dhanraj, Munich (DE); Stefan Haeusler, Munich (DE); Christoph Kilian, Unterschleissheim (DE); Robert Krueger, Sehmatal (DE); Maximilian Meissner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/809,448

(22) Filed: Mar. 4, 2020

(65) Prior Publication Data
US 2020/0198435 A1    Jun. 25, 2020

Related U.S. Application Data (63) Continuation of application No. PCT/EP2018/071368, filed on Aug. 7, 2018.

(30) Foreign Application Priority Data

Sep. 5, 2017   (DE) ..................... 10 2017 215 526.4

(51) Int. Cl.
*B60G 21/073* (2006.01)
*B60G 21/055* (2006.01)

(52) U.S. Cl.
CPC ....... *B60G 21/073* (2013.01); *B60G 21/0558* (2013.01); *B60G 2202/413* (2013.01); *B60G 2400/98* (2013.01)

(58) Field of Classification Search
CPC .............. B60G 21/073; B60G 2400/98; B60G 2202/413; B60G 2202/135; B60G 21/0558; B60G 21/055; B60G 2202/22
See application file for complete search history.

(56) References Cited

U.S. PATENT DOCUMENTS 1,982,853 A    12/1934   Brainard
6,098,765 A *  8/2000   Kato ...................... B60G 17/04
                                                              188/290
(Continued)

FOREIGN PATENT DOCUMENTS

DE       102004051601 A1 *  5/2006   ............ F15B 21/065
DE    10 2006 051 682 A1    2/2008
(Continued)

OTHER PUBLICATIONS

Machine translation of DE102014018732 (Year: 2014).*
(Continued)

*Primary Examiner* — James A English
*Assistant Examiner* — Kurtis Nielson
(74) *Attorney, Agent, or Firm* — Crowell & Moring, LLP (57) ABSTRACT A switchable stabilizer assembly of a vehicle, in particular for roll stabilization. The stabilizer assembly includes a first stabilizer half and a second stabilizer half, both coupled to a wheel of the vehicle, where the first and second stabilizer halves are coupled rotatably relative to each other about their longitudinal axis by a hydraulic actuator. The actuator has at least two working chambers filled with a hydraulic medium and has at least one fluid-conducting connection of variable flow cross section between the at least two working chambers. The working chambers are not elastically deformable. Instead, a spring element is arranged in the at least two working chambers and/or in at least two further working chambers of the actuator and is supported between a rotor and a stator of the actuator. The flow cross section of the fluid-conducting connection can be varied depending on the vibration frequency of the stabilizer assembly.

11 Claims, 4 Drawing Sheets

(56) References Cited

U.S. PATENT DOCUMENTS

| | | | | |
|---|---|---|---|---|
| 6,318,522 B1 * | 11/2001 | Johnston | ................ | B60G 3/202 |
| | | | | 188/267.2 |
| 9,944,148 B2 | 4/2018 | Villegas Muriel et al. | | |
| 2004/0217569 A1 * | 11/2004 | Gradu | ................ | B60G 21/0555 |
| | | | | 280/124.107 |
| 2005/0067798 A1 * | 3/2005 | Uchiyama | .......... | B60G 21/0555 |
| | | | | 280/5.511 |
| 2005/0079066 A1 * | 4/2005 | Tatsuya | .............. | B60G 21/0555 |
| | | | | 417/313 |
| 2016/0089951 A1 * | 3/2016 | Jeon | ................... | B60G 21/0555 |
| | | | | 280/5.508 |
| 2020/0070617 A1 * | 3/2020 | Lim | .................. | B60G 21/0558 |
| 2020/0376919 A1 * | 12/2020 | Lim | .................... | B60G 21/055 |

FOREIGN PATENT DOCUMENTS

| | | | | | |
|---|---|---|---|---|---|
| DE | 102009020249 A1 | * | 11/2010 | ......... | B60G 21/0555 |
| DE | 10 2013 211 021 A1 | | 12/2014 | | |
| DE | 10 2014 018 732 A1 | | 6/2015 | | |
| DE | 102014018732 A1 | * | 6/2015 | ......... | B60G 21/0556 |
| DE | 10 2015 203 906 A1 | | 9/2016 | | |
| DE | 10 2017 118 044 A1 | | 2/2018 | | |
| DE | 102017114324 A1 | * | 1/2019 | ......... | B60G 21/0555 |
| GB | 2275661 A | * | 9/1994 | ................ | F16F 9/53 |
| GB | 2454013 A | * | 4/2009 | ......... | B60G 21/0553 |
| JP | 01012908 A | * | 1/1989 | ......... | B60G 21/0553 |
| JP | 09030234 A | * | 2/1997 | ......... | B60G 21/0555 |
| WO | WO-2011012635 A1 | * | 2/2011 | ......... | B60G 17/0185 |
| WO | WO 2018/028888 A1 | | 2/2018 | | |

OTHER PUBLICATIONS

Machine translation of DE102009020249 (Year: 2009).*
Description of GB2454013 (Year: 2009).*
PCT/EP2018/071368, International Search Report dated Oct. 30, 2018 (Three (3) pages).
German Search Report issued in German counterpart application No. 10 2017 215 526.4 dated Jul. 5, 2018, with Statement of Relevancy (Seven (7) pages).

* cited by examiner

SWITCHABLE STABILIZER ASSEMBLY OF A VEHICLE

CROSS REFERENCE TO RELATED APPLICATIONS

This application is a continuation of PCT International Application No. PCT/EP2018/071368, filed Aug. 7, 2018, which claims priority under 35 U.S.C. § 119 from German Patent Application No. 10 2017 215 526.4, filed Sep. 5, 2017, the entire disclosures of which are herein expressly incorporated by reference.

BACKGROUND AND SUMMARY OF THE INVENTION

The invention relates to a switchable stabilizer assembly of a vehicle. Reference is exemplarily made to DE 10 2006 051 682 A1 with regard to the prior art.

Roadway excitations affecting a vehicle wheel, for example given uneven roadway conditions, or cornering by two-track vehicles may subject the vehicle to undesirable rolling and/or pitching movements. In the process, driving safety, driving dynamics and comfort may be negatively influenced and altered. Known from prior art for diminishing or ameliorating these rolling and/or pitching movements is to secure so-called stabilizers, i.e., special suspension systems, to one or both axles of the vehicle. A distinction is here made between three different stabilizer configurations. A so-called passive stabilizer operates according to the torsion bar principle. An integrally designed torsion bar is here arranged parallel to the vehicle axis structure, and secured to a wheel suspension at both ends. Different vertical movements of the wheels are adjusted by the elastic deformation or twisting of this torsion bar stabilizer. However, the passive stabilizer can only store the absorbed kinetic energy temporarily, and then releases it again. The counterforces absorbed by the system can here not be regulated, but instead result from the relative movements that come about depending on the driving situation. In terms of their dimensioning and material composition, passive stabilizers are thus designed for a predetermined spring rate, so that they can only absorb torsion forces of a specific size and apply corresponding counterforces. A conflict here arises between comfort, meaning a desired soft suspension, and driving dynamics and driving safety, meaning a desired hard suspension. As a result, passive stabilizers are basically only conditionally suitable in particular for motor vehicles provided for use both on the road and off the road.

Apart from the mentioned passive stabilizers, there also exist so-called active stabilizers, which usually have a two-part design. A respective end of a stabilizer half is here connected with a vehicle wheel or a wheel suspension. The two stabilizer halves are then usually connected with each other by a suitable actuator, which actively turns the two stabilizer halves opposite each other by means of a suitable actuator. As opposed to the passive stabilizers, active stabilizers can introduce forces and torques between the vehicle structure and chassis and generate desired actuating paths as needed. These forces are then no longer the result of body movements, but rather are functions of any variables desired, for example a lateral acceleration or rolling angle. The rolling angle can be reduced and the vehicle structure leveled by applying targeted counter-roll torques and actively turning the stabilizer, for example when driving around curves, in the process. Decoupling with the vehicle driving straight ahead reduces copy effects, since no vertical torques are applied to the vehicle axle, wherein driving comfort can be significantly increased. Therefore, the mentioned conflict between comfort and driving dynamics can be resolved with active stabilizers. However, such active systems are dependent upon external power (pumping device, motor, etc.), which leads to additional costs, weight and problems associated with installation space.

Also known from prior art are so-called semi-active stabilizers, in which no pumping device is provided, and the working chambers of one or several semi-active actuators, for example swivel motors, are connected with each other via actively controlled valves. The volume flow between the working chambers is here controlled by the valves. Since a movement by the actuator, for example the rotor of a swivel motor, is required to generate a volume flow between the working chambers, which in turn builds up a force in the chassis system so as to counter the undesired vehicle movements, the semi-active chassis system is controlled in response to the undesired vehicle movements. Therefore, energy is only required for actuating the valves. As opposed to an active stabilizer, however, no forces are activated in a semi-active stabilizer, but rather a suspension generated as a function of the valve setting (i.e., the switching of two characteristic curves) and exclusively in response to the rolling and/or pitching movements of the vehicle. For example, the mentioned publication DE 10 2006 051 682 A1 describes a semi-active twist beam rear suspension with a stabilizer function, in which elastically deformable hollow bodies comprise the working chambers of an actuator. Balance lines connecting the hollow bodies are here provided, through which a fluid can move from one respective pushed-in hollow chamber into the respective other chamber of a hollow chamber pair. As a consequence, the valve throughput makes it possible to vary the fluid exchange, and thus the stiffness, of the hydraulic rotating coupling.

DE 10 2014 018 732 A1 illustrates a stabilizer of a vehicle in which hydraulic chambers are fluidically coupled with each other by means of a frequency-selective high-pass valve.

The object of this invention is to indicate a stabilizer that can be switched to different spring rates without the necessity of a costly pumping device or a motor.

A preferably switchable stabilizer assembly of a vehicle is here proposed, in particular for roll stabilization. The stabilizer here comprises first and second stabilizer halves each coupled with a wheel of the vehicle. The first and second stabilizer halves are coupled rotatably opposite each other around their longitudinal axis by means of a suitable hydraulic (preferably semi-active) actuator. The hydraulic actuator itself has at least two working chambers filled with a hydraulic fluid, wherein at least one fluid-conducting connection is arranged between the mentioned working chambers. The fluid-conducting connection has an actively variable flow cross section.

According to the invention, the mentioned working chambers are not, for their part, elastically deformable; instead, a spring element is arranged in the at least two working chambers of the actuator and/or in at least two additional working chambers of the actuator, and is supported between a rotor and a stator of the actuator.

Within the meaning of this invention, a "non-elastically deformability" must be construed to mean that the mentioned working chambers do not elastically deform, at least when used according to the invention. The fact that each substance or material might potentially be elastically deformable to some extent is here not to be understood as "elastic deformation" in the sense of this invention.

It is here preferable that there be a non-rotatable connection between the first stabilizer half and the rotor of the actuator, and between the second stabilizer half and the stator of the actuator.

Within the meaning of the invention, the term "semi-active" (which describes the preferred design of the actuator) means that an external power supply is necessary solely for changing the flow cross section of the mentioned fluid-conducting connection between the working chambers. As opposed to the already described active stabilizer, no external power supply is required for moving the actuator, meaning for moving the rotor relative to the stator of the actuator.

In a preferred embodiment of the invention, the actuator is designed as a hydraulic swivel motor. As already stated, the difference relative to a swivel motor known from prior art is that it in this case does not require that any power be supplied for executing the movement, but only that the flow cross section of the fluid-conducting connection be switched or changed, as will be described in greater detail below. It is here preferable that the one stabilizer half be non-rotatably connected with the swivel motor rotor, and the other stabilizer half with the swivel motor stator. The swivel motor can here have at least two working chambers filled with a hydraulic medium, which are connected to each other via a mentioned fluid-conducting connection. At least two different spring characteristics of the stabilizers can be switched between by actively changing the flow cross section of the connection and having the accompanying ability to vary or adjust the throttle effect of the hydraulic fluid.

The two working chambers connected by a respective fluid-conducting connection inside of the actuator are referred to below as a working chamber pair, since they have to be connected to ensure the functionality of the actuator or functionality of the preferably switchable, semi-active stabilizer.

It is further provided that the flow cross section of the fluid-conducting connection can be varied as a function of the vibration frequency of the stabilizer assembly or the two stabilizer halves or the swivel motor rotor.

A frequency-selective control element or a frequency-selective valve is here preferably used as the coupling element of the fluid-conducting connection between the working chambers.

Such a frequency-selective control element can enable a frequency-selective damping.

A frequency-selective valve can detect the vibration frequencies in the hydraulic medium, and automatically open or close them in specific frequency ranges. To this end, the damping force is preferably configured by the control element of the fluid chambers to the movement frequency of the vehicle or movement frequency of the stabilizer movement in such way as to achieve a low damping force at higher frequencies (in particular frequencies in a range higher than 2-5 Hz), and a high damping force at lower frequencies (in particular frequencies in a range lower than 2-5 Hz). Additional details and embodiments for such a frequency-selective control element on the stabilizer assembly according to the invention are explained in greater depth in the exemplary embodiments in the description to the Figures.

The fluid-conducting connection between the respective working chamber pairs preferably takes the form of a line or channel.

The flow cross section of the fluid-conducting connection can here be changed by means of another control element (i.e., in addition to the frequency-selective control element), for example a valve or slider, an opener or closer, or by means of a throttle.

The control element can completely separate or completely open the fluid-conducting connection, or even just decrease the flow cross section without effecting a complete separation of the connection. Depending on the velocity of the inflowing hydraulic medium into the fluid-conducting connection during a movement by the rotor, only just partially closing the connection can yield varying throttle effects, and hence simultaneously an additional damping.

The flow cross section is here changed, for example by means of a control element, via active actuation. No additional external power supply other than for this active actuation is necessary for executing the switchable stability function according to the invention.

For example, the spring elements according to the invention can be arranged in two additional working chambers, meaning in addition to the already present working chamber pair filled with a hydraulic medium. The additional working chamber pair, in which the spring elements are supported between the rotor and the stator of the actuator, can also be filled with a hydraulic medium, depending on the desired damping or suspension. To ensure the functionality of the last mentioned embodiment, however, it is preferred once again that there be a fluid-conducting connection along with a measure for changing the flow cross section of this connection between the two additional working chambers.

However, it is likewise also conceivable that the spring elements according to the invention be arranged in the already present working chamber pair.

As already mentioned, the spring elements themselves are supported between the stator and the rotor of the actuator in two working chambers, and can be exemplarily configured as a coil spring, an elastically deformable elastomer or plastic, a torsion spring, a metal fabric, a plastic foam or a gas. All possible materials, embodiments and physical states of the spring elements are generally conceivable, provided the latter constitutes an appreciably compressible element.

The embodiment according to the invention always keeps the two stabilizer halves at least minimally coupled with each other. A defined maximum twist angle of the two stabilizer halves relative to each other here prevails, which is characterized by a defined number of stops or the selected number of fluid-filled working chambers or working chamber pairs. To this end, the spring element is supported in a torsional manner between the first stabilizer half, i.e., between the rotor of the actuator, and the second stabilizer half, i.e., the stator of the actuator, which constitutes or comprises the aforementioned stop. A desired force-path characteristic curve can be set between the stops by means of the spring elements. A spring element with a suitable spring rate can thus be selected depending on the desired force-path characteristic curve or torsional stiffness of the stabilizer.

Therefore, if the connection of the fluid-filled working chambers inside the actuator has been established or the additional control element or control elements initiate(s) an exchange of the hydraulic medium through the connection in order to change the flow cross section, the spring elements model the desired torsional stiffness of the stabilizer according to the desired force-path course. The stabilizer is here given the softest or least stiff design given a maximum possible flow cross section of the hydraulic medium in the connection. In the open state of the control element, the force-path characteristic curve thus depends on the spring rate of the spring elements, and ultimately also on the material-induced basic stiffness of the individual stabilizer halves. Various force-path courses can be realized for the former; for example, a progressive course can be selected in this way. The two stabilizer halves are quasi-minimally or slightly coupled in an open state of the fluid-conducting connection, so that a high traveling comfort can be ensured, for example during straight ahead travel and given existing uneven roads.

By contrast, if the fluid-conducting connection between the working chambers is blocked, for example by a closer or a closed valve, the two working chambers are no longer able to freely communicate by means of the hydraulic medium or there exists no fluid flow between the working chambers, and the two stabilizer halves are maximally coupled. This produces a passive stabilizer of the kind already described. The latter has a force-path course of a conventional, integral stabilizer according to the torsion bar principle. In this maximally coupled state, the stabilizer is the hardest or stiffest.

The two last mentioned states each describe the situation regarding the torsional stiffness of the stabilizer given a maximum flow cross section, i.e., given a completely open control element (meaning the control element that does not operate in a frequency-selective manner) and given a blockade of the connection, i.e., given a completely closed control element. However, as already explained, it is also possible to reduce, but not completely close, the flow cross section of the fluid-conducting connection between the working chambers. These intermediate settings of the control element can benefit the velocity-dependent force-path course. This is because the hydraulic medium flows at a different velocity from one working chamber via the fluid-conducting connection into the other working chamber depending on the external shock impetus or wheel movement. In this way, varying throttle effects, and thus a varying force-path course, can be set by suitably tightening or expanding the flow cross section.

For example, an oil or hydraulic fluid can be used as the hydraulic medium or mentioned fluid with which the respective working chambers are filled.

The mentioned arrangement of spring elements according to the invention inside of the working chambers in the actuator can advantageously be used to realize a switchable, semi-active stabilizer assembly, without needing to have additional expensive and heavy devices that take up installation space.

In a preferred embodiment of the technology according to the invention, at least one additional, second actuator is connected in series with the already described first actuator is viewed along the longitudinal axis of the stabilizer. This second actuator is geometrically designed like the first actuator. The latter also comprises a rotor, a stator and at least two working chambers filled with a hydraulic medium, which are connected with each other by a fluid-conducting connection. The flow cross section of the fluid-conducting connection can also be varied. The mentioned second actuator is likewise comprised of an arrangement of spring elements. The only difference relative to the first actuator is a potentially different arrangement or number of spring elements inside of the actuator, along with for example a spring rate or stiffness of the spring elements that can be varyingly adjusted (in a specific manner).

Furthermore, in another preferred embodiment of the invention, a third or another actuator is connected in series with the already described first or second or with the two already described actuators. The mentioned third actuator differs from the other two already mentioned actuators in that it has no spring elements. Given such an embodiment with three actuators, the housing, meaning the stator, can be fixedly connected by two adjacent actuators or constitute a shared component. The rotor of the external actuator of the latter two can here represent the first stabilizer half, while the rotor of the (in this case) middle actuator is fixedly connected with the housing (e.g., in the form of a shaft) of the third actuator. As a consequence, the housing of the third actuator becomes the quasi rotor thereof. The second stabilizer half is then arranged within the third actuator.

For example, when using two series-connected actuators, one respective stabilizer half is preferably non-rotatably connected with the rotor of one of the two actuators. The two actuators here preferably comprise a shared housing, which for its part encompasses the stators or stops. The housing or stator is not fixedly connected with any stabilizer half.

In no way does the mentioned embodiment limit the number of actuators connected in series along the longitudinal stabilizer axis to three actuators. In addition, it is in no way provided, for example, that the actuator referred to as the "third" one in this specification, meaning the one without a spring element, must also be the third one viewed quantitatively. The latter can just as well be used with only two actuators in an embodiment. The same holds true for the first and second actuator.

The purpose of cascading or series-connecting the individual actuators along the longitudinal stabilizer axis is to be able to set or switch varying force-path characteristic curves or varying stabilizer stiffnesses by suitably switching or changing over between the actuators. Depending on the series-connected actuators in which the respective fluid-conducting connection or several connections or all connections were/was established, the stabilizer has the force-path characteristic curve or spring rate of the actuator then in use. As a consequence, the fluid-conducting connection between the working chambers is then blocked in the other actuators, which is why the latter are not used or have a purely passive stabilizer effect within the meaning of this invention.

As a result of the described series connection of several actuators along the longitudinal stabilizer axis, with at least one of the actuators comprising an arrangement of spring elements according to the invention, various stabilizer stiffnesses or torsional stiffnesses can be switched between, adjusted to the respective driving situation that exists.

The various switching positions of the actuators (i.e., whether they are used or not) can here each be tailored to a specific driving mode. For example, three driving modes are possible given two series-connected actuators. If one of the series-connected actuators here comprises the spring elements according to the invention and the other comprises none of these spring elements, the following three driving modes can be switched between:

The first driving mode into which the stabilizer can be switched is a so-called "sport mode". None of the fluid-conducting connections is here established in the two actuators. For example, the control element (meaning in particular the control element that does not operate in a frequency-selective manner) for changing the flow cross section of the fluid-conducting connection is in a closed position in each actuator. This type of arrangement yields the arising passive stabilizer in its hardest or stiffest form. Such a switching position of the actuators is helpful in particular when negotiating curves, e.g., for increasing the driving dynamics.

The second settable driving mode is a comfort mode. At least one fluid-conducting connection between two working chambers is here established in the actuator, which comprises the spring elements according to the invention. No fluid-conducting connection between the working chambers is established in the actuator without any spring elements. The force-path characteristic curve of the first actuator (i.e., the one with spring elements) is thus set on the stabilizer, which produces a softer or less stiff stabilizer configuration due to the present fluid-conducting connection between the working chambers and the spring elements according to the invention. A soft stabilizer configuration means that there is a minimal coupling between the two stabilizer halves, and the two stabilizer halves can move more independently (than in a hard position of the stabilizer) or with lots of play relative to each other. For example, this driving mode makes sense given a desired comfortable (straight line) drive on the highway.

The third switchable driving mode (in the mentioned series connection of two actuators) is an off-road mode. For this purpose, it makes sense to decouple the two stabilizer halves from each other as far as possible. The actuator having no spring elements can here be switched or the fluid-conducting connection can be established in this actuator. The first actuator comprising the spring elements according to the invention is then not switched (i.e., the respective control element for changing the flow cross section is in a closed state). This mode represents a sensible variant when driving off-road over unevenly bumpy terrain.

Switching between the respectively desired actuators by opening or establishing the fluid-conducting connection between the working chambers of an actuator takes place actively, as already mentioned.

A control element of at least one actuator that changes the flow cross section of the connection is here preferably coupled with a control unit. This control element (i.e., in particular the control element that does not operate in a frequency-selective manner), which is preferably a valve, is open, closed or partially closed depending on boundary conditions.

For example, one possible boundary condition can be the lateral acceleration of the vehicle, a height of the wheel, a steering angle, a roll angle, navigation system information among many others.

Upon detection of a curvy road, for example, the control unit can prompt the stabilizer assembly to switch to the sport mode as the result of a constantly changing steering angle. On the other hand, for example, if navigation system information indicates that the vehicle will be traveling predominantly along a straight line for a prolonged time, the stabilizer setting can be switched to the comfort mode. In an especially preferred embodiment of the invention, the mentioned control unit is designed as a regulating unit.

In another preferred embodiment of the invention, the mentioned control element (i.e., in particular the control element that does not operate in a frequency-selective manner) of at least one actuator, preferably the control elements (i.e., in particular the control elements that do not operate in a frequency-selective manner) of all present actuators, is/are coupled with an external actuating device. The control element (preferably a valve that does not operate in a frequency-selective manner) is then open, closed or partially closed, depending on an actuation of the external actuating device. For example, such an actuating device can be a so-called motoring experience switch, which the driver him or herself can use to select their desired driving mode. For example, if the driver has planned an off-road drive or if the driver is on uneven and rough terrain, he or she can switch the at least approximately decoupled stabilizer setting by manually changing over to the terrain mode. While driving straight ahead, for example on a highway, and if desiring a comfortable ride, the driver can switch the driving mode, and hence the stabilizer assembly, into the comfort mode. Should the driver prefer a dynamic drive, for example with curved sections, he or she can switch into the sport mode.

Depending on the driving mode selected, the driver here actuates or switches the respective control element (preferably a valve) to change the flow cross section of the suitable, fluid-conducting connection. The control element (i.e., in particular the control element that does not operate in a frequency-selective manner) is here preferably actuated electrically or through electrical activation.

In an advantageous embodiment of the technology according to the invention, the mentioned control element (i.e., in particular the control element that does not operate in a frequency-selective manner) is closed in a de-energized state. As an alternative or depending on the configuration of the respective actuators, the mentioned control element can likewise be open in a de-energized state. It is only important here that, given a failure of the respective control unit or regulating unit or actuating device for switching the respective control elements, the stabilizer assembly be switched based on a failsafe principle into a mode or position that ensures sufficient safety in all driving situations or during each driving maneuver. If for whatever reason energy cannot be supplied, and hence the control elements cannot be actuated, it is therefore preferred that the control element assume a prescribed position. To this end, for example, the control element can be designed as a solenoid valve, so that the valve automatically jumps or shifts into either an open or closed state given a power failure or in a de-energized state. Alternatively, a servo valve can likewise be used as the throttle.

In addition, a roll damping effect can be achieved by directly coupling the fluid chambers (by means of the mentioned control element, i.e., the control element that does not operate in a frequency-selective manner). The damping properties can be influenced by changing the flow cross section by configuring the control element as a throttle and/or diaphragm and/or nozzle. The flow cross section can be narrowed by means of a constant and/or adjustable diaphragm/throttle. Use could be made of the following exemplary embodiments: needle throttle, longitudinal notch, longitudinal notch with diaphragm, peripheral notch, slotted throttle, slider, gap throttle. A combination of passive and/or active valve and constant and/or variable diaphragm/throttle can likewise be used to realize a change in the stabilizer stiffness and a damping effect.

If the control elements are closed in a de-energized state, the stabilizer assembly is in the described sport mode, and thus in a comparably hard or stiff setting. At least an adequate driving safety can here be ensured (albeit to the detriment of driving comfort).

It is likewise preferably provided that the control element (i.e., in particular the control element that does not operate in a frequency-selective manner) only be switched from the quasi-decoupled state of the two stabilizer halves into a coupled state of the latter if the two stabilizer halves are in the zero position. In the zero position means that none of the two stabilizer halves are suspended or twisted, so that both are in a neutral position or design position. For example, height sensors can be used to precisely determine the position of the two stabilizer halves. It would be just as conceivable to determine the zero position of the stabilizer halves with a suitable sensor.

For example, this can be done using a magnetic switch, which is quasi-secured to the location in the actuator in which the rotor is in the zero position. Once the command to switch the control element (i.e., in particular the control element that does not operate in a frequency-selective manner) has been given, the latter is practically only switched as the rotor passes by the magnetic switch. In this way, it can be ensured that the control element will actually only be switched in the zero position of the stabilizer halves. For example, it is likewise conceivable to use an angle sensor for determining the position of the stabilizer halves.

In a next preferred embodiment of the invention, at least one actuator between at least two working chambers of this actuator has a second fluid-conducting connection. Viewed in the zero position of the stabilizer or in the design position or in the unloaded state of the stabilizer, such an additional connection as a quasi-bypass or overflow element is arranged in direct proximity to the rotor on the working chambers. Given high-frequency inputs with low amplitudes of the kind usually encountered on rough roads, it enables a defined rotational angle of the rotor, and hence an improved ride comfort or remaining comfort, even given a stiff switching mode or position (i.e., with the fluid-conducting connection not established). Additional connections like these can be designed as an additional channel or a recess in the stator, for example.

A mentioned second fluid-conducting connection, as a quasi-bypass, can also comprise an additional control element that changes the flow cross section, which is coupled with a control unit, and is open, closed or partially closed depending on boundary conditions. For example, an actuatable or switchable valve can be provided in the second fluid-conducting connection of at least one actuator.

The invention will be explained further below based on four exemplary embodiments. All features described in detail can here be essential to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
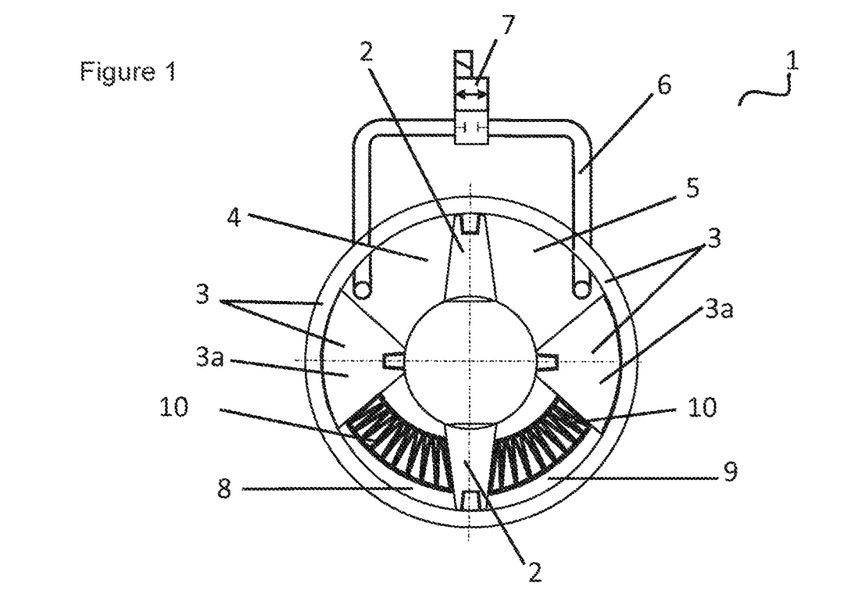
FIG. 1 and FIG. 2 each here present a schematic illustration of the construction according to the invention in a cross section of an actuator.

FIG. 1 presents a cross section through a hydraulic, semi-active actuator of a stabilizer assembly according to the invention. This actuator 1 couples a first with a second stabilizer half (neither shown) so that they can be rotated against each other around their longitudinal axis. The first stabilizer half is here non-rotatably connected with a rotor 2 of the actuator 1, and the second stabilizer half with a stator 3 of the actuator 1. The hydraulic actuator 1 itself has two working chambers 4, 5 filled with a hydraulic fluid, wherein a fluid-conducting connection 6 is arranged between the mentioned working chambers 4, 5. The flow cross section of the fluid-conducting connection 6 can be actively varied by means of a valve 7.

According to the invention, the mentioned working chambers 4, 5 are for their part not elastically deformable; instead, in each case spring element 10 is arranged in two additional working chambers 8, 9 of the actuator 1, and supported between the rotor 2 and stator 3 of the actuator 1. The actuator or stabilizer is in an unloaded position or in the zero position on FIG. 1, in which the two stabilizer halves are not twisted opposite each other. The valve 7 can be adjusted between an open, closed and intermediate position. The hydraulic medium can flow over into the working chambers 4, 5 with the valve 7 open. The maximum angle of twist for the two stabilizer halves or between the rotor 2 and stator 3 depends on the number of stops 3a formed by the stator 3. The spring elements 10 according to the invention, which are each supported on the rotor 2 and stator 3, can be used to set the force-path characteristic curve or spring rate of the stabilizer (with the valve open). Since the valve 7 is closed on FIG. 1, no exchange of hydraulic medium takes place between the two working chambers 4, 5. The two stabilizer halves are here maximally coupled with each other, and the stabilizer thus acts like a conventional torsion bar. The latter has the force-path course of a conventional, integral stabilizer. Therefore, if the valve is closed, the stabilizer is in a sport mode. The sport mode makes sense in particular if a dynamic and agile drive is desired, for example while maneuvering curves.

Figure 2:
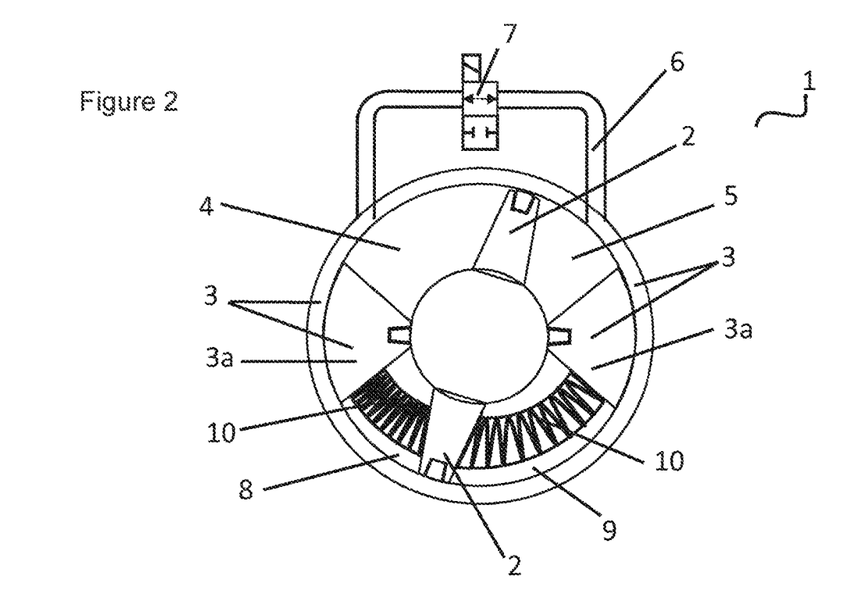

If the valve 7 is open as depicted on FIG. 2, hydraulic medium can be exchanged from one working chamber 5 into the other working chamber 4 (and vice versa, of course). Depending on the load, the overflow of hydraulic medium from one of the working chambers 4, 5 into the other thus causes the one stabilizer half or the rotor 2 to twist relative to the other stabilizer half or to the stator 3. The spring rate of the spring elements 10 here determines how high the prevailing torsional stiffness is. With the valve 7 open, the stabilizer is thus in a softer setting, i.e., the two stabilizer halves can twist opposite each other more easily than with the valve 7 closed. In order to reach the desired force-path characteristic curve of the stabilizer with the valve 7 open, the spring elements are configured accordingly in terms of their material and geometry.

This makes it easy to provide a switchable, semi-active stabilizer assembly which requires neither an external pumping device nor a motor.

Figure 3:
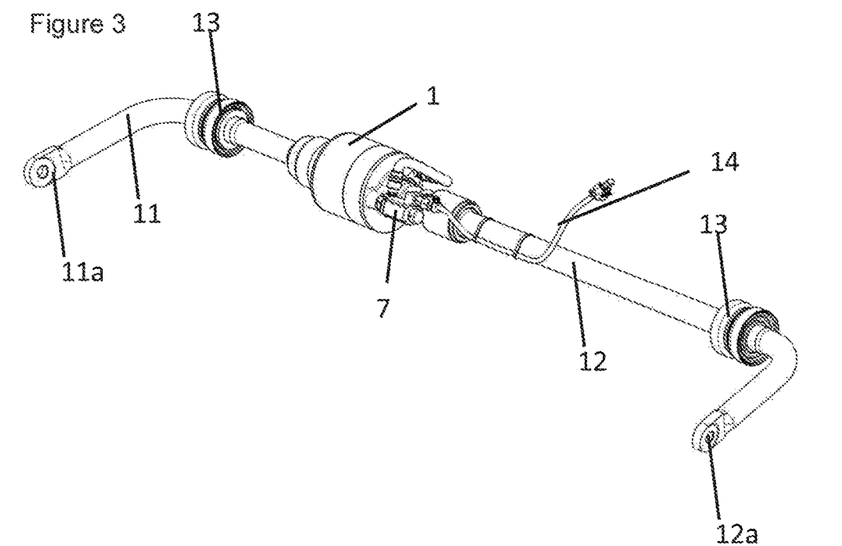
FIG. 3, FIG. 4 and FIG. 5 show a schematic, three-dimensional view of stabilizer assemblies according to the invention.

FIG. 3 exemplarily shows a stabilizer assembly according to the invention in a three-dimensional illustration. The actuator 1 already discernible on FIG. 1 and FIG. 2 is here shown, and couples the two stabilizer halves 11, 12 so that they can be twisted relative to each other. Both stabilizer halves 11, 12 are here connected with a vehicle wheel (not visible) at their outer ends 11a, 12a and by way of specific mountings 13 with a vehicle body (also not sketched in). The valve 7 can open, close or only partially close the mentioned fluid-conducting connection 6 between the two working chambers 4, 5, and is here actuated or set by an electrical signal in an electrical line 14. The actuation can here take place via a control unit depending on outside boundary conditions or via an actuating device, for example which is switched by the driver him or herself.

Figure 4:
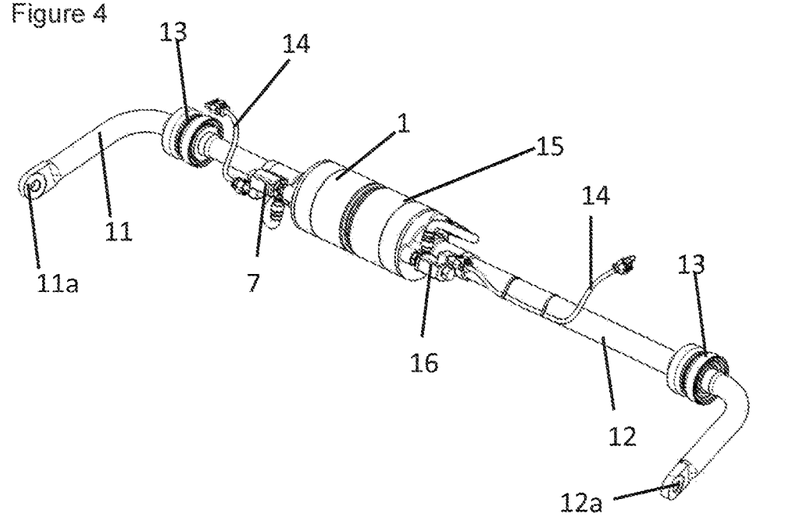

FIG. 4 shows another embodiment of the stabilizer assembly according to the invention. Apart from an already described actuator 1 from FIG. 1 and FIG. 2, another second actuator 15 is arranged or connected in series to the latter. As opposed to the described actuator 1, none of the spring elements 10 according to the invention are arranged in the second actuator 15, as evident on FIG. 5 (in which the housing of the actuators is not shown). A stabilizer half 11 is here fixedly connected with the rotor 2 of the first actuator 1, while the other stabilizer half 12 is fixedly connected with a rotor 16 of the second actuator 15. The two actuators 1, 15 comprise a shared housing, which for its part also comprises the stators 3 or stops 3a. The stators 3 or the shared housing of the two actuators 1, 15 is not fixedly connected with any stabilizer half 11, 12.

Figure 5:
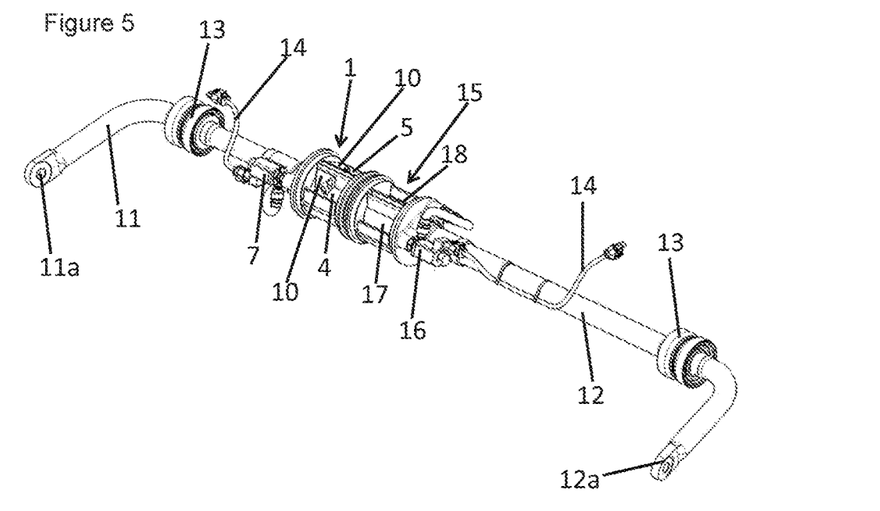

Both actuators have a valve 7, 16, which can separate or establish a fluid-conducting connection 6 between the respective working chambers 4, 5, 17, 18. The depicted series connection between the two actuators 1, 15 makes it possible to switch between a total of three different driving modes or stabilizer stiffnesses or spring rates. For example, if both valves 7, 16 of both actuators 1, 15 are closed, the two stabilizer halves 11, 12 are maximally coupled together, and the stabilizer acts like an integral torsion bar. This comparatively hard or stiff arrangement of the stabilizer makes sense in particular when driving around curves for reasons of driving dynamics and driving safety, and is thus referred to as the sport mode. By contrast, if the valve 7 of the first actuator 1 (i.e., the actuator 1 with the spring elements 10 according to the invention) is open and the valve 16 of the second actuator 15 is closed, the force-path course of the stabilizer depends on the spring rate of the spring elements 10. Because the stabilizer has a comparatively soft or less stiff configuration, the vehicle can be correspondingly more comfortable to drive. However, if it is desired that the two stabilizer halves 11, 12 be decoupled from each other, which makes sense in particular on uneven terrain, the stabilizer can be switched into an off-road mode. To this end, the valve 16 of the second actuator 15 is opened, and the valve 7 of the first actuator 1 is closed. The hydraulic fluid can in this way freely communicate or flow between the two working chambers 17, 18, wherein the two stabilizer halves 11, 12 are nearly decoupled.

Figure 6:
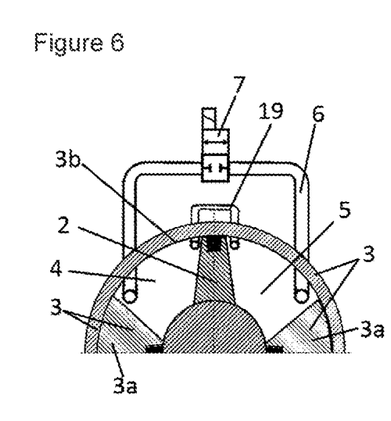
FIG. 6 and FIG. 7 show two embodiments of a second fluid-conducting connection in a cross section of the actuator.
Figure 7:
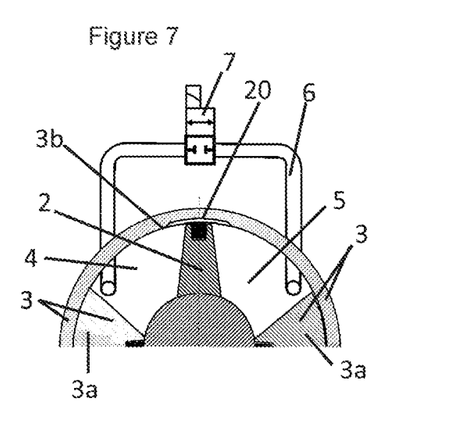

FIG. 6 and FIG. 7 show a cutout from a schematically depicted cross section of the actuator 1 with exemplary embodiments of a bypass channel 19 or an overflow recess 20. To this end, an additional connection channel 19 is arranged in direct proximity to the rotor 3 located in an unloaded or immovable position between the two working chambers 4, 5. In this case, an "unloaded position" means that the stabilizer is in the zero position or design position. It is just as likely possible, as shown on FIG. 7, to arrange a narrow overflow recess 20 on the inner diameter 3b of the stator 3 in direct proximity to the idle rotor 2 instead of a connection channel 19. At high-frequency loads or twists with low amplitudes of the kind usually encountered on rough roads or while driving over cobblestones, a recess 20 or this type of channel 19 enables a small rotational angle of the rotor, and hence an improved ride comfort or remaining comfort, even in the stiff or hard switching mode or position. The mentioned remaining comfort varies depending on the prevailing angle of twist of the rotor 2 up to which a fluid exchange is possible within the channel 19 or overflow recess 20, and thus depending on the position of the entry or exit of the hydraulic medium in the channel 19 or in the overflow recess 20 on the inner diameter of the stator 3b.

Figures 8, 9:
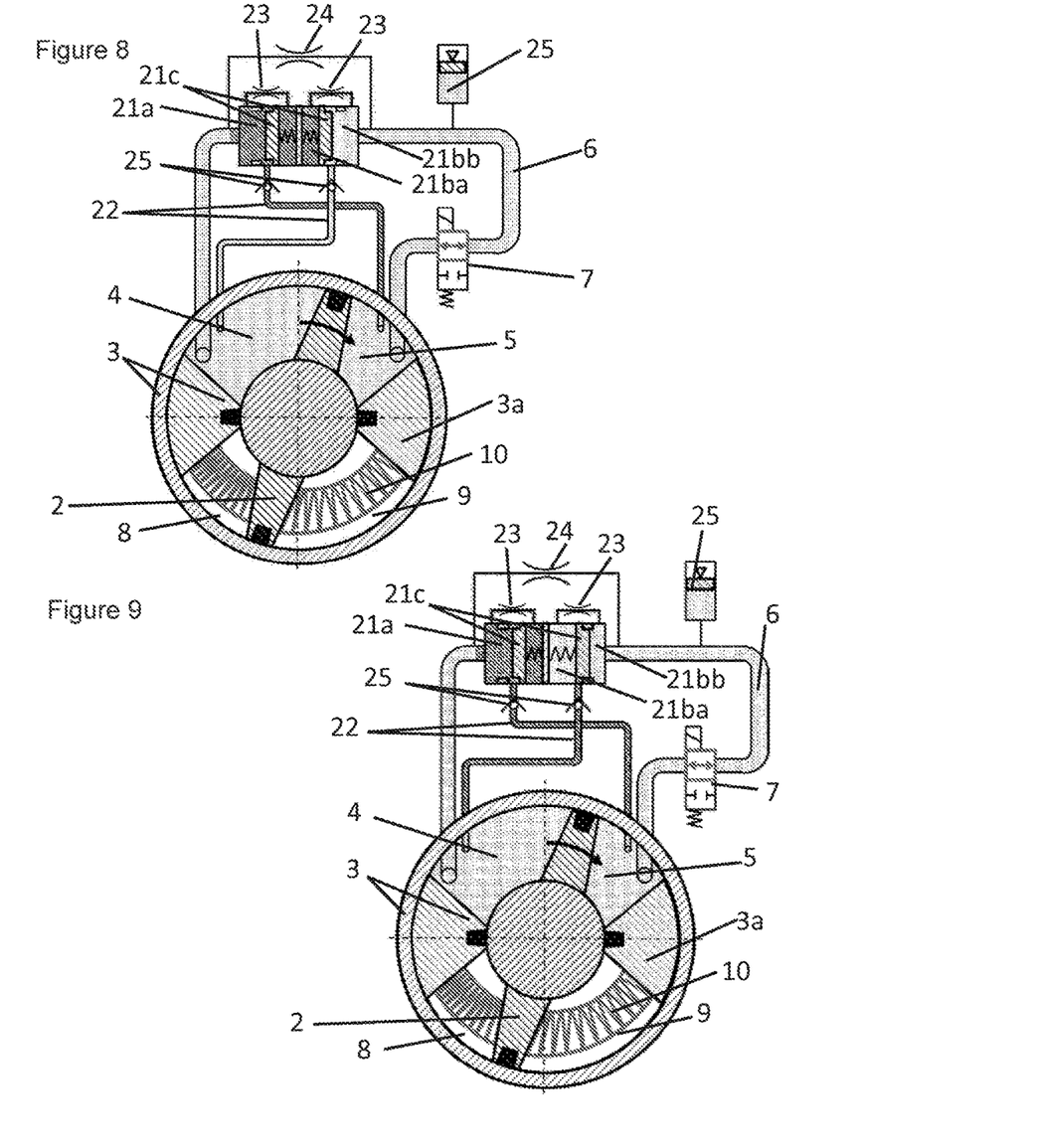
FIG. 8 and FIG. 9 show the embodiment of an actuator of a stabilizer assembly according to the invention, in which two working chambers are fluidically connected with a frequency-selective valve.

FIG. 8 and FIG. 9 show the embodiment of an actuator of a stabilizer assembly according to the invention, in which two working chambers 4, 5 are fluidically connected with a frequency-selective valve 21.

Such a frequency-selective control element can enable a frequency-selective damping.

A frequency-selective valve can detect the vibration frequencies in the hydraulic medium and automatically open or close them in specific frequency ranges. To this end, the damping force is preferably configured by the control element of the fluid chambers to the movement frequency of the vehicle or movement frequency of the stabilizer movement or rotor movement in such way as to achieve a low damping force at higher frequencies (in particular frequencies in a range higher than 2-5 Hz), and a high damping force at lower frequencies (in particular frequencies in a range lower than 2-5 Hz).

The valve 21 itself consists of two chambers 21a, 21b, which each comprise a movable or displaceable piston 21c. In addition, a fluid line 22 runs from each chamber 21a, 21b of the valve 21 back into the working chambers 4, 5 of the actuator (also referred to as bypass lines 22). These bypass lines 22 or fluid lines 22 are here designed with the help of a check valve 26 in such a way as to allow the fluid to flow in only one direction, specifically in the direction of the respective working chamber 4, 5. Furthermore, a pressure compensation valve 25 is arranged on the fluid-conducting connection 6 for pressure compensation of the system.

Depending on the twisting direction of the stabilizer halves relative to each other, one of the two chambers 21a, 21b of the valve 21 is always in operation. For this reason, the mode of action of the right chamber 21b will be described below; however, it manifests itself in an equivalent fashion to the left chamber 21a given a different twisting direction of the stabilizer halves relative to each other.

The piston 21c in the valve 21 covers or closes the mentioned bypass line 22 in a specific position. In addition, the piston 21c forms two working spaces 21ba, 21bb within the chamber 21b of the valve 21. These two working spaces 21ba, 21bb are for their part fluidically connected with each other by a throttle 23. These throttles 23 are also referred to as "small" throttles, and arranged inside of the valve 21 for pressure compensation.

Arranged so as to bridge the valve 21 is an additional throttle 24 also referred to as "large throttle" 24, through which the hydraulic medium can also flow.

The operating principle of the frequency-selective valve 21 inside of the stabilizer assembly will be explained in more detail in the following sections and Figures.

Let it be noted beforehand that the valve 7 (i.e., a valve that is not frequency selective) is additionally arranged to even enable or entirely prevent a fluidic connection between the working chambers 4, 5 of the actuator. If the valve 7 is closed instead, the fluid-conducting connection 6 of the two working chambers 4, 5 is locked or blocked. The frequency-selective valve 21 is then not used, and the stabilizer assembly acts as a conventional, passive stabilizer.

A situation in which the valve 7 is thus open will be described in the following explanation.

FIG. 8 here shows the situation in which the stabilizer halves move relative to each other in the higher-frequency range or in which the rotor of the swivel motor vibrates at a higher frequency. The fluid or hydraulic medium is here initially conducted via the "large" throttle 24. However, this large throttle 24 only allows a limited volume flow per unit of time. The remaining fluid, which no longer flows through via the large throttle 24, is passed through the frequency-selective valve 21. As the pressure rises (i.e., at higher frequencies), the piston 21c of the valve 21 moves in such a way as to allow the fluid to flow through the bypass line 22. This reduces the damping force, since the resistance through the bypasses 22 is distinctly lower, and more fluid can pass through the bypass 22 than through the large throttle 24.

FIG. 9 shows the situation in which the valve 7 is open for establishing a fluid-conducting connection of the working chambers 4, 5 relative to each other, and the stabilizer halves or rotor of the actuator move at low frequencies.

The fluid can flow through the large throttle 24 at a lower pressure or at lower frequencies, while the piston 21c of the valve 21 is at a position in which it seals the bypass line 22. Since the resistance of the large throttle 24 is distinctly higher than the resistance of the bypass lines 22, the damping force in the low-frequency or lower-frequency vibration range of the stabilizer assembly is higher than in the higher-frequency range.

LIST OF REFERENCE CHARACTERS

1 Actuator
2 Rotor
3 Stator
3a Stop
3b Inner diameter of the stator
4 Working chamber
5 Working chamber
6 Fluid-conducting connection
7 Valve
8 Working chamber
9 Working chamber
10 Spring element
11 Stabilizer half
11a End of the stabilizer half
12a End of the stabilizer half
12 Stabilizer half
13 Mounting
14 Line
15 Second actuator
16 Valve
17 Working chamber
18 Working chamber
19 Channel
20 Overflow recess
21 Frequency-selective valve
21a Chamber of the frequency-selective valve
21b Chamber of the frequency-selective valve
21c Piston
22 Bypass line
23 Throttle
24 Throttle
25 Pressure compensation valve The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A switchable stabilizer assembly of a vehicle, comprising:
    a first stabilizer half and a second stabilizer half, wherein the first stabilizer half and the second stabilizer half are each coupled with a respective wheel of the vehicle; and
    a first hydraulic actuator, wherein the first and the second stabilizer halves are coupled rotatably against each other around a respective longitudinal axis by the first hydraulic actuator, wherein the first hydraulic actuator has at least two working chambers filled with a hydraulic medium, wherein the first hydraulic actuator has a first fluid-conducting connection between the at least two working chambers, and wherein a flow cross section of the first fluid-conducting connection is variable by a valve;
    wherein the at least two working chambers of the first hydraulic actuator are not elastically deformable, wherein a first spring element is disposed in the at least two working chambers of the first hydraulic actuator and/or in at least two additional working chambers of the first hydraulic actuator and is supported between a rotor and a stator of the first hydraulic actuator, and wherein the first spring element sets a force-path characteristic curve or a spring rate of the switchable stabilizer assembly with the valve in an open position;
    wherein the flow cross section of the first fluid-conducting connection is variable as a function of a vibration frequency of the switchable stabilizer assembly.

2. The switchable stabilizer assembly according to claim 1, wherein the flow cross section of the first fluid-conducting connection is variable by a frequency-selective control element.

3. The switchable stabilizer assembly according to claim 1, wherein the first stabilizer half is non-rotatably connected with the rotor and wherein the second stabilizer half is non-rotatably connected with the stator.

4. The switchable stabilizer assembly according to claim 1, wherein a second hydraulic actuator is connected in series with the first hydraulic actuator.

5. The switchable stabilizer assembly according to claim 4, wherein a third hydraulic actuator is connected in series with the first hydraulic actuator and/or with the second hydraulic actuator and wherein the third hydraulic actuator does not have a spring element.

6. The switchable stabilizer assembly according to claim 4, wherein the second hydraulic actuator has a second spring element and wherein the first and second spring elements have a respective variable spring rate.

7. The switchable stabilizer assembly according to claim 1, wherein a control element that changes the flow cross section of the first fluid-conducting connection is coupled with a control unit, and is open, closed or partially closed depending on boundary conditions.

8. The switchable stabilizer assembly according to claim 7, wherein the control element is closed in a de-energized state.

9. The switchable stabilizer assembly according to claim 1, wherein a control element that changes the flow cross section of the first fluid-conducting connection is coupled with an external actuating device, and is open, closed or partially closed depending on an actuation of the external actuating device.

10. The switchable stabilizer assembly according to claim 1 further comprising a second fluid-conducting connection between the at least two working chambers of the first hydraulic actuator.

11. The switchable stabilizer assembly according to claim 10, wherein a control element that changes a flow cross section of the second fluid-conducting connection is coupled with a control unit, and is open, closed or partially closed depending on boundary conditions.

* * * * *